Oct. 7, 1924.  
J. O. BALL  
1,510,757

COMBINED SHOVEL AND ASH SIFTER.

Filed May 31, 1924

INVENTOR

Patented Oct. 7, 1924.

1,510,757

UNITED STATES PATENT OFFICE.

JAY OTIS BALL, OF BOGOTA, NEW JERSEY.

COMBINED SHOVEL AND ASH SIFTER.

Application filed May 31, 1924. Serial No. 717,066.

*To all whom it may concern:*

Be it known that I, JAY OTIS BALL, a citizen of the United States, residing at Bogota, in the county of Bergen and State of New Jersey, have invented a new and useful Combined Shovel and Ash Sifter.

The object of the invention is to provide a combined shovel and ash sifter constructed whereby the fine ashes contained with the coarser material are permitted to fall through or separate from the coarse unburned fuel which may be saved and reused.

More specifically, my invention comprises a shovel having prongs extending therefrom and an auxiliary sifting member which is likewise provided with prongs and movable relative to said shovel.

Figure 1:
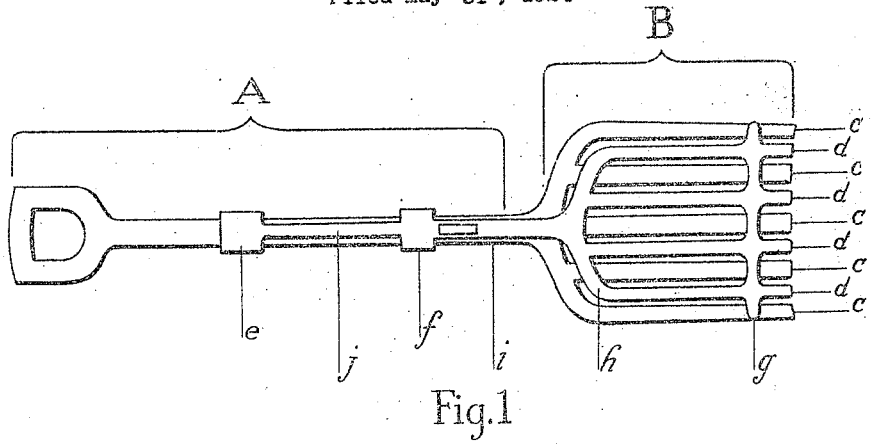
Figure 2:
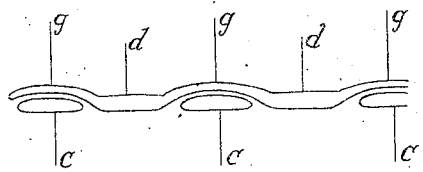
Figure 3:
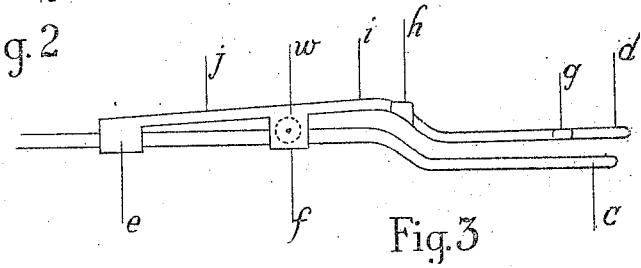

In the accompanying drawings I have shown a preferred embodiment of the invention, in which Figure 1 illustrates a top elevation, Figure 2 a sectional view through the shovel; and, Figure 3 a side elevation.

In referring now more specifically to the drawings wherein like reference characters indicate corresponding parts, the shovel disclosed has the usual handle A with a shovel portion B constructed with a series of separated outstanding prongs c. This construction of the shovel somewhat resembles a spading fork, but it is, of course, manifest that various structures can be used so long as spaces are provided between sections of the shovel.

Mounted upon the shovel and slidable with reference thereto is a sifter having a handle portion f and a sifting section h formed with a plurality of prongs d connected by web portions g. The prongs d of the sifting sections are arranged alternately between the prong c of the shovel B and said sifter section is prevented from falling through the spaces between the prong c of the shovel by reason of the transverse webs g. It is to be observed that the sifter section also is provided with a sleeve e that embraces the shovel handle so as to be slidable thereon and a sleeve f spaced from the sleeve e which moves over an anti-friction bearing or wheel w carried by the handle of the shovel so as to facilitate a reciprocating movement of the sifter section with respect to the shovel. In other words, by gripping the portion e of the sifter section the same may be moved back and forth to cause a corresponding movement of the section h thereof with reference to the prongs c of the shovel.

In operation ashes are removed from a furnace or the like by the shovel and the sifter section is then reciprocated by the handle j. This reciprocating movement causes the small fine particles and the ashes to leave the sifter and the shovel through the spaces arranged between the alternately disposed prongs c and d of the shovel and the sifter respectively, while the larger sized material, which obviously contains much unburned coal will remain on the sifter element.

It will be clearly understood that the invention is not limited to the specific construction of the sifter element, nor the detailed construction of the handle, nor the mounting for the sifter, as such construction may be materially changed without departing from the spirit of this invention.

Having thus described my invention, what I claim is:

1. The combination with a shovel having a handle and a shovel portion provided with a plurality of spaced prongs, a sifter element formed with a handle portion and prongs adapted to overlie said shovel with the prongs of the sifter element disposed between the prongs of the shovel, webs connecting the prongs of the sifter element, and means for mounting said sifter element on the handle of the shovel to permit movement thereof relative to the shovel.

2. The combination with a shovel having a handle and a perforated shovel portion, of a perforated sifter element adapted to be carried by said handle and overlying the shovel, and means for mounting said sifter element to permit a combined vertical and horizontal movement thereof relative to the shovel.

JAY OTIS BALL.